(No Model.) 2 Sheets—Sheet 1.

J. THOMPSON.
LUMBER REGISTER.

No. 364,063. Patented May 31, 1887.

WITNESSES:

INVENTOR:
J. Thompson
BY Munn & Co.
ATTORNEYS.

(No Model.)

J. THOMPSON.
LUMBER REGISTER.

No. 364,063. Patented May 31, 1887.

WITNESSES:

INVENTOR:
J. Thompson

BY Munn & Co.
ATTORNEYS.

UNITED STATES PATENT OFFICE.

JOHN THOMPSON, OF MINNEAPOLIS, MINNESOTA.

LUMBER-REGISTER.

SPECIFICATION forming part of Letters Patent No. 364,063, dated May 31, 1887.

Application filed July 7, 1886. Serial No. 207,327. (No model.)

*To all whom it may concern:*

Be it known that I, JOHN THOMPSON, of Minneapolis, in the county of Hennepin and State of Minnesota, have invented a new and Improved Lumber-Register, of which the following is a full, clear, and exact description.

My invention relates to lumber-registers, and has for its object to accurately and speedily obtain the number of feet in a given amount of lumber by simply drawing the register across the face of the various boards, and to indicate the total number of feet upon proper dials affixed thereto.

It consists in splining to the axle of a drive-wheel a cone-pinion, whereby motion is communicated to a series of registering-disks, the several pinions constituting the cone representing each a standard length of lumber, the number of cogs thereon corresponding to the number of feet contained in the length of its representative piece; also, in the mechanism employed whereby the pinions are thrown in and out of gear with the registering disk, and in the details of construction of the register, as will be hereinafter fully set forth and claimed.

Reference is to be had to the accompanying drawings, forming a part of this specification, in which similar letters of reference indicate corresponding parts in all the figures.

Figure 1:
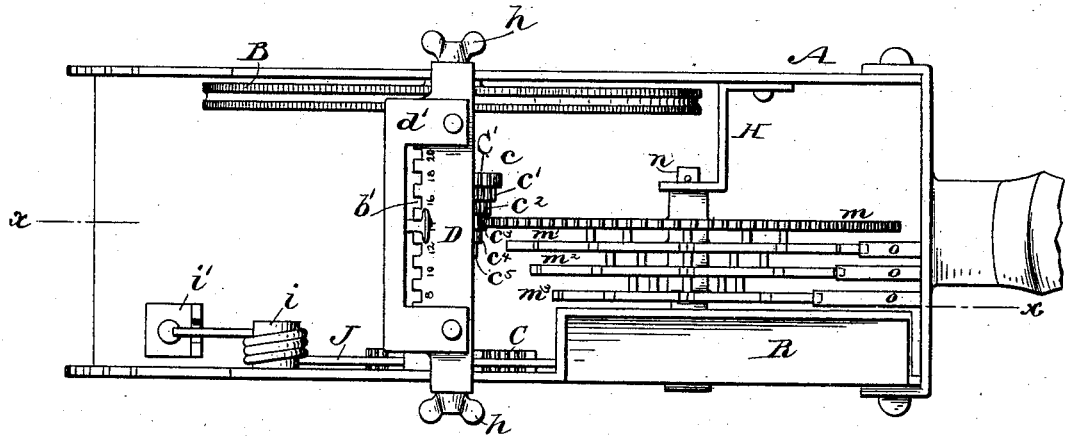
Figure 2:
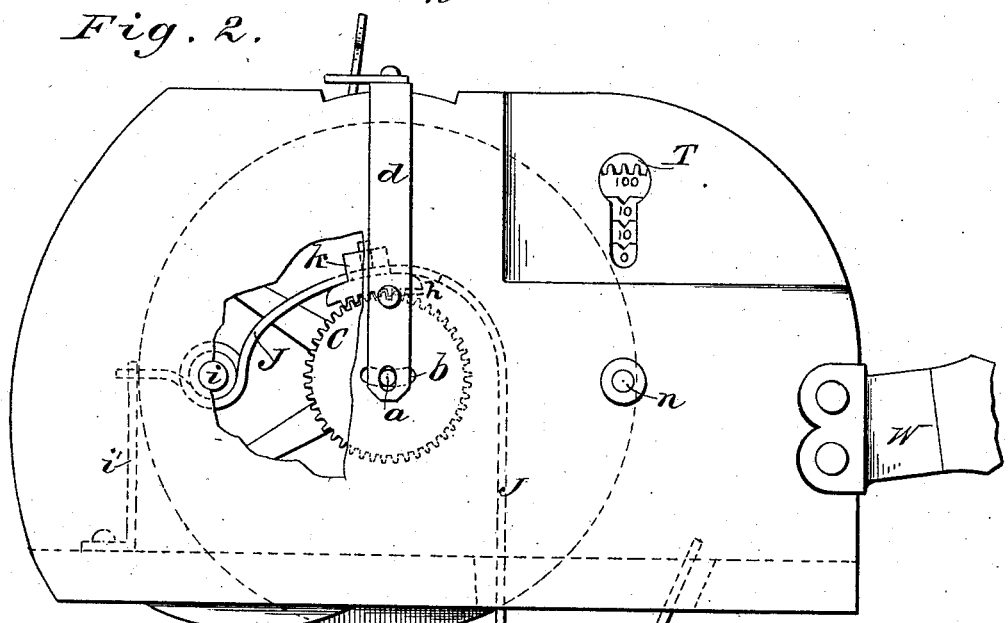
Figure 3:
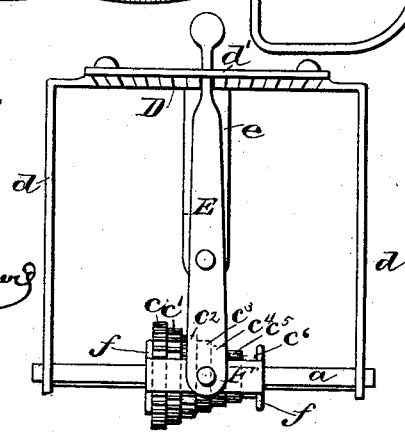
Figure 4:
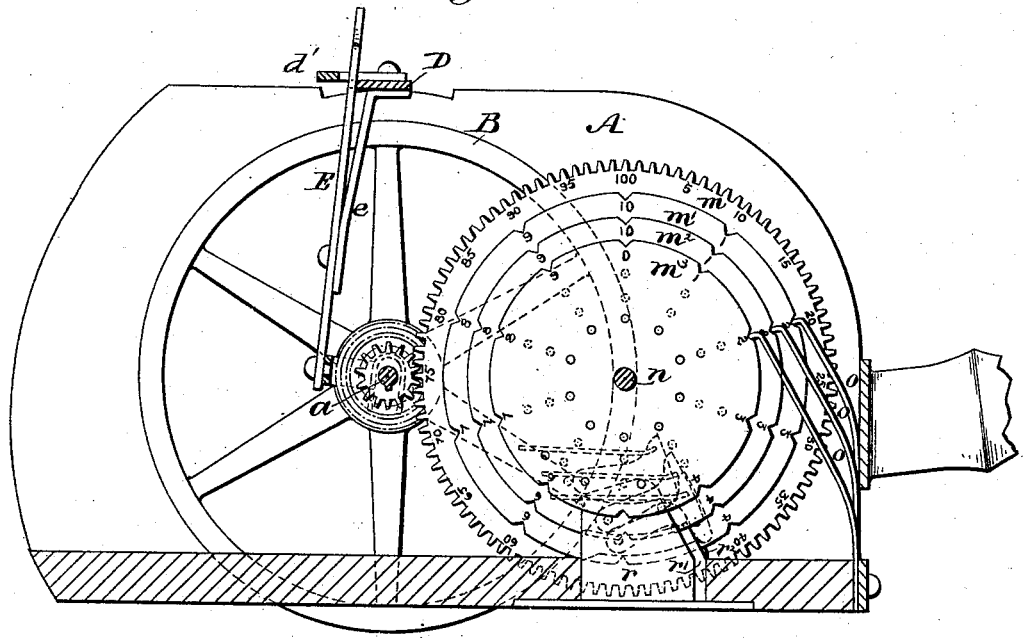
Figure 5:
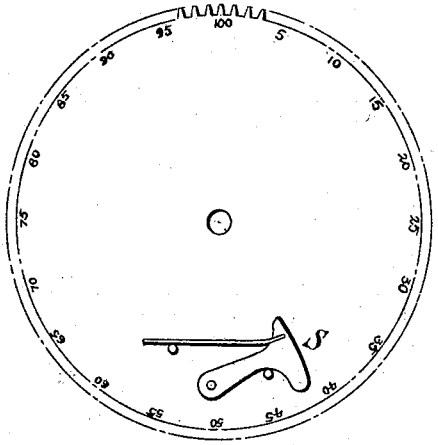

Figure 1 is a plan view of my register; Fig. 2, a side elevation, partly cut away, the pivoting screw of the lever-arm being removed; Fig. 3, a detail view of the cone-pinion and its shifter; Fig. 4, a longitudinal section taken through line *x x* of Fig. 1; Fig. 5, a side view of the toothed registering-dial, showing the position of the spring-actuated pawl; and Fig. 6, a side elevation of another dial, illustrating the position of the pins adapted to engage the spring-pawl shown in Fig. 5.

A represents the casing of my lumber-register, and B a drive-wheel, twelve inches in circumference, keyed to the shaft *a*, which is journaled in slots *b*, formed in each side of said casing A.

Splined upon the shaft *a*, between the drive-wheel B and a toothed wheel, C, securely attached thereto upon the end opposite the said drive-wheel, is a cone-pulley, C', formed with the pinions $c\ c'\ c^2\ c^3\ c^4\ c^5\ c^6$, having, respectively, eight, ten, twelve, fourteen, sixteen, eighteen, and twenty cogs, the largest, *c*, twenty cogs and the smallest, $c^6$, eight, representing each the different standard length of marketable lumber.

An indicating-plate, D, having a series of short recesses, *b'*, cut therein, numbered, respectively, to correspond with the number of cogs of the various pinions constituting the cone above mentioned, extends over the top of the register-casing from side to side, and is provided with lever-arms *d*, which, extending down outside the casing at right angles to the plate thereto, are apertured at their extremities to engage the ends of the shaft *a*. The arms *d* are provided with apertures *h'* at about one-third their length above the shaft *a*, through which thumb-screws *h* enter corresponding threaded apertures in the casing, the said screws *h* forming the fulcrums for the lever-arms *d*.

A guard, *d'*, projecting outside of the indicating-plate D and inclosing the recesses *b'*, cut therein, is attached to the upper face of said plate D, to form a guide for the upper end of the shifting-lever E, adapted to enter said recesses.

The shifting-lever E is pivoted below its center to brace *e*, which extends downward from and is attached centrally to the under side of the indicating-plate D, and a yoke, F, adapted to inclose the pinions $c\ c'\ c^2\ c^3\ c^4\ c^5\ c^6$ by means of vertical forked arms *f*, (shown in dotted lines, Fig. 4,) fitting over the shaft *a*, is pivoted to its lower end. Thus a lateral adjustment of the pinion upon the shaft *a* is had through the medium of the shifting-lever E, and a longitudinal adjustment of the shaft *a* itself, carrying the drive-wheel B and the cone-pinion in the slots *b*, is obtained by means of the indicating-plate D and its arms *d d*. By turning up the winged thumb screw *h* upon each side, passing through the said arms *d* into the casing A, the shaft *a* is rigidly held at any desired position within the compass of its adjustment.

A spring, J, coiled around an extension, *i*, on the inner side of the register, has one end supported in a standard, *i'*, screwed to the inner face of the bottom. The other end, curving up over the toothed wheel C upon the end of shaft *a*, carries a semicircular rack, *k*, held in place by a set-screw and adapted to mesh into the said toothed wheel C to prevent the shaft $a$ from turning when the machine is lifted up from a board, as will be hereinafter fully set forth, and, continuing around over the wheel C, extends downward below the bottom through an opening made therein for that purpose, and parallel with the bottom of the register-casing up through the same opening to a point just within the register-casing, as shown in position and dotted lines in Fig. 2. Therefore, when the register is placed upon a board to be drawn across its face, the spring J is pushed up in a line with the drive-wheel B, which extends slightly below the bottom of the register-casing, causing the toothed rack $k$, in engagement with the toothed wheel C, which is rigidly attached to the shaft $a$, to disengage therefrom and allow the drive-wheel keyed to the shaft to revolve and register, as hereinafter described. As the drive-wheel B passes off the face of the board, the spring drops down and the toothed rack again meshes with its wheel C, and the registry is stopped until the register is once more placed in position upon the lumber.

Into a Z-shaped standard, H, attached upon the inner side of the casing A in front of the drive-wheel B, is journaled one end of a short shaft, $n$, its other end being journaled in the opposite side of the casing, upon which revolve registering-dials $m$ $m'$ $m^2$ $m^3$, each of smaller dimensions than the succeeding ones.

The registering-dial $m$ has teeth cut in its periphery, each tooth representing one foot, and numbering one hundred in all, which is indicated upon its face opposite the division by numbers stamped therein. Each of the other dials has notches cut in its periphery, at suitable equidistance, numbering ten in each and stamped, respectively, from one to ten.

Springs $o$, fastened to the front of the register, curve over to and engage the notches in the dials $m^1$ $m^2$ $m^3$ and hold the said dials at the point of registry until revolved farther by mechanism, as hereinafter described. Three cams, $r$ $r'$ $r^2$, are entered from and secured upon the bottom of the register-casing, and extend up between the dials, the largest, $r$, between dials $m^2$ and $m^3$, the next, $r'$, between dials $m'$ and $m^2$, and the shorter, $r^2$, between the dial $m'$ and the toothed dial $m$.

Figure 6:
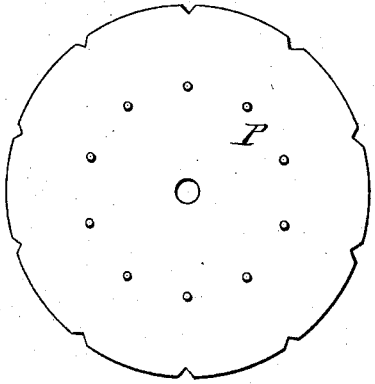

The inner side of the toothed dial $m$ is provided with a spring-actuated pawl, S, pivoted thereto near its periphery, as shown in Fig. 5. The next dial, $m'$, is fitted upon its face opposite the toothed-dial $m$ with a circle of pins, P, corresponding in number to the notches in its periphery, as shown in Fig. 6, while its reverse face is provided with a spring-actuated pawl similarly constructed and situated to that of the toothed dial $m$. The next dial, $m^2$, is similar in construction to dial $m'$, above described, while the dial $m^3$ has simply a circle of pins upon its inner face, its outer face being smooth, as is also the outer face of the toothed dial $m$. Upon the toothed dial $m$ the tens are registered, upon dial $m'$ the hundreds, upon dial $m^2$ the thousands, and upon dial $m^3$ the tens of thousands.

The casing A is struck back upon one side in the upper forward corner, forming a recess, R, thereby bringing the casing nearer the dials, the numbers upon which are read through an opening, T, cut in the front vertical side of said recess. The machine is provided with a handle, W, fastened to its front end.

Should it be desired to measure a pile of boards twelve feet long, for instance, and ascertain the number of feet therein, the operation will be as follows:

The register is placed upon a board close by any flat surface, which causes the spring J to slide up and release the toothed wheel C from its retaining-rack $k$. The thumb screws $h$ in the side of the arms $d$ are now loosened and the shaft $a$ thrown back to the rear, so as to separate the cone-pinion from the toothed registering-wheel by means of the top indicating-plate, D. The shifting-lever is now lifted out of one of the recesses $b'$ in the top plate, D, representing the length of boards last measured—for instance, twenty—and slid along to engage the recess marked 12. This operation brings the pinion $c^4$ of the cone having twelve cogs thereon in position to engage the toothed registering-dial $m$. The shaft $a$, carrying the cone-pinion, is then brought forward again by means of the said indicating-plate D and arms $d$ $d$, the pinion $c^4$ thereby being caused to mesh with the toothed dial $m$. The thumb-screws $h$ are now screwed down tight to hold the shaft and pinion up to its work.

I now proceed to draw the instrument across the face of a board in the pile which is twelve inches wide. The driving-wheel will travel across in one revolution, it being twelve inches in circumference, revolving the pinion keyed to the same shaft also one revolution. It having twelve cogs thereon, will turn the toothed registering-dial twelve teeth, representing twelve feet on its face. The next board is one foot six inches wide. The drive-wheel will now in passing make a revolution and a half, the pinion the same, and the toothed dial is consequently turned eighteen teeth more, showing thereon the aggregate amount of thirty feet, the contents of the two boards measured, and so on through the pile. The spring J stops the registry as soon as the edge of the board is passed and releases the shaft simultaneously with the movement of the drive-wheel upon the board.

When sufficient lumber has been measured to amount to one hundred feet, one hundred will appear upon the dial in front of the opening T, and the spring-actuated pawl S, upon the inner face of the said toothed dial $m$, will have now reached the highest point upon its cam $r^2$ and engaged a pin within the circle upon the opposite face of the dial $m'$. As the toothed-dial $m$ passes 100 the pawl is released from the cam and carries dial $m'$ one notch up, showing a registry of one hundred feet. The toothed dial $m$ continues registry to one hundred, and as each one hundred feet is measured upon the toothed dial the dial $m'$ moves another notch until one thousand feet has been measured. The pawl upon the dial $m'$ will then engage a pin upon the opposite dial $m^2$, and it will be carried forward in its turn one notch, indicating one thousand feet. When the amount of lumber measured amounts to nine hundred and ninety-nine feet, the pawl upon the dial $m^2$ engages a pin upon the opposite face of the dial $m^3$, turning it shortly after, as the other foot is measured, to 1, showing ten thousand feet, and so on throughout.

The time consumed in shifting the lever E to measure the different-length boards in the various piles is slight, the operation so simple that none can mistake, and the accuracy of the measurement registered beyond question. The register is drawn toward the person using it in the process of measuring.

Having thus fully described my invention, I claim as new and desire to secure by Letters Patent—

1. In a lumber-register, the combination, with the drive-wheel thereof and the toothed dial of a registering device, of a cone-pinion held to slide on the same shaft with the drive-wheel, substantially as shown and described.

2. In a lumber-register, the combination, with the drive-wheel thereof, the toothed wheel of a registering device, and a cone-pulley, of two arms pivoted on the sides of the register-casing, united above said casing by a plate and carrying at their free end the shaft of the measuring-wheel, substantially as shown and described, and for the purpose herein set forth.

3. In a lumber-register, the combination, with the drive-wheel thereof, the toothed wheel of a registering device, a cone-pulley, and two arms pivoted on the sides of the register-casing united above said casing by a plate provided with notches numbered to correspond with the sections of the said cone-pulley, of a shifting-lever for said cone-pulley pivoted on one arm of said plate and adapted to engage the notches of the plate, substantially as shown and described, and for the purpose herein set forth.

4. In a lumber-register, the combination, with the drive-wheel thereof, the toothed wheel of a registering device, a cone-pulley, and two arms pivoted on the sides of the register-casing by thumb-screws passing through said arms and corresponding threaded apertures in the casing, of a shifting-lever for said cone-pulley pivoted on one arm of said plate and adapted to engage the notches of the plate, substantially as shown and described, and for the purpose herein set forth.

5. In a lumber-register provided with a casing, A, having slots $b$ therein, the combination, with the shaft $a$, journaled in said slots and provided with a drive-wheel keyed thereto, and a cone-pinion splined thereon, of the indicating-plate D, having arms $d\ d$, integral therewith, apertured to receive the ends of the shaft $a$, and the winged thumb-screws $h$, pivoting said arms $d$ to the casing A, substantially in the manner and for the purpose herein set forth.

6. In a lumber-register provided with the casing A, the combination, with the indicating-plate D, provided with arms $d\ d$, carrying the shaft $a$, having a cone-pinion splined thereon, the said indicating-plate D having numbered recesses $b'$ therein, the guard $d'$ secured to its upper face and the brace $e$ to its lower face, of the shifting-lever E, pivoted to the brace $e$ near its center and at its lower end to a yoke, F, embracing said cone-pulley, substantially in the manner and for the purpose herein set forth.

7. In a lumber-register, the combination, with the drive-wheel and toothed dial of a registering device, of a cone-pinion held to slide on the shaft of the drive-wheel, having the number of cogs thereon corresponding with the standard lengths of marketable lumber, substantially as shown and described, and for the purpose herein set forth.

8. In a lumber-register, the combination, with the shaft $a$, having a toothed wheel, C, keyed thereto, of a spring, J, curving over said toothed wheel and carrying a toothed rack, $k$, meshing with the wheel C, the said spring adapted to project vertically downward below the bottom of the register-casing and, extending a distance parallel therewith, curve upward to a position within said casing, substantially as shown and described, and for the purpose herein set forth.

JOHN THOMPSON.

Witnesses:
L. E. STETLER,
JAMES LONDAR.